United States Patent [19]

Hempstead et al.

[11] 4,242,710
[45] Dec. 30, 1980

[54] THIN FILM HEAD HAVING NEGATIVE MAGNETOSTRICTION

[75] Inventors: Robert D. Hempstead, Morgan Hill; James B. Money, San Jose, both of Calif.

[73] Assignee: International Business Machines Corporation, Armonk, N.Y.

[21] Appl. No.: 7,274

[22] Filed: Jan. 29, 1979

[51] Int. Cl.³ .......................... G11B 5/12; G11B 5/30
[52] U.S. Cl. ..................................... 360/113; 360/126
[58] Field of Search .............. 360/113, 111, 123, 125, 360/126-127; 338/32 R; 324/249

[56] References Cited

U.S. PATENT DOCUMENTS

| | | | |
|---|---|---|---|
| 3,549,428 | 12/1970 | Lommel | 148/31.55 |
| 3,639,699 | 2/1972 | Tiemann | 360/126 |
| 3,774,134 | 11/1973 | Kardashian et al. | 324/249 X |
| 3,781,476 | 12/1973 | Hanazono et al. | 360/123 |
| 3,961,299 | 6/1976 | Lazzari et al. | 360/126 |
| 4,044,394 | 8/1977 | Hanazono et al. | 360/123 |

FOREIGN PATENT DOCUMENTS 50-37417  8/1973  Japan .
50-61211  9/1973  Japan .

OTHER PUBLICATIONS

Physical Review, vol. 70, Nos. 11-12, Dec. 1 & 15, 1946, pp. 923-932, "Magnetoresistive and Domain Theory of Iron-Nickel Alloys", by Bozorth.

*Primary Examiner*—John H. Wolff
*Attorney, Agent, or Firm*—Nathan N. Kallman

[57] ABSTRACT

A thin film inductive head is formed with nickel-iron binary alloy or nickel-iron-X ternary alloy pole pieces characterized by negative magnetostriction having a saturation magnetostriction coefficient in the range of $-1 \times 10^{-6}$ to $-5 \times 10^{-6}$.

5 Claims, 3 Drawing Figures

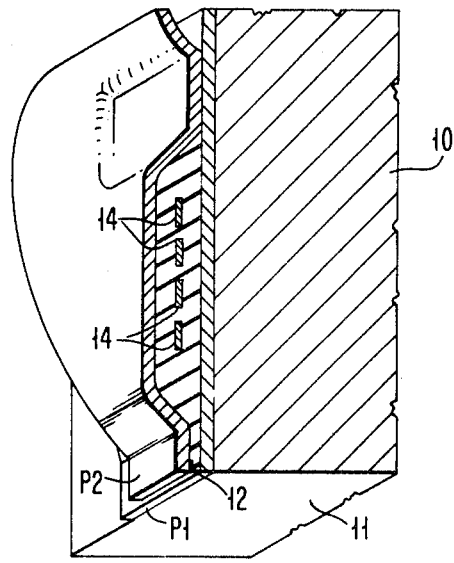

FIG. 1

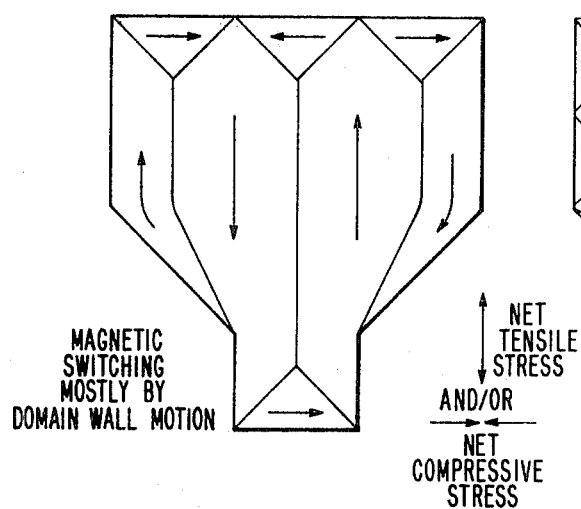

FIG. 2
POSITIVE MAGNETOSTRICTION
(IRON-RICH COMPOSITION)

MAGNETIC SWITCHING MOSTLY BY DOMAIN WALL MOTION

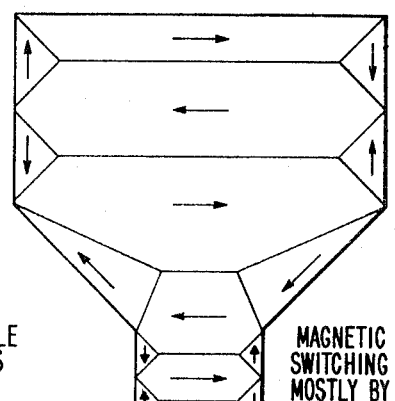

FIG. 3
NEGATIVE MAGNETOSTRICTION
(NICKEL-RICH COMPOSITION)

MAGNETIC SWITCHING MOSTLY BY ROTATION

NET TENSILE STRESS
AND/OR
NET COMPRESSIVE STRESS

↕ DIRECTION OF APPLIED MAGNETIC FIELD FROM RECORDING MEDIUM ↕

DIRECTION OF MAGNETIZATION WITHIN DOMAIN →
MAGNETIC DOMAIN WALL ——

THIN FILM HEAD HAVING NEGATIVE MAGNETOSTRICTION

TECHNICAL FIELD

This invention relates to a thin film inductive magnetic head, and in particular to a thin film head having magnetic pole pieces formed with material having negative magnetostriction.

An object of this invention is to provide an improved thin film head having minimal magnetic instabilities.

Another object of this invention is to provide an improved thin film head which affords a readback signal with reductions in waveform distortion and bit shift effects.

BACKGROUND ART

In the prior art, magnetic properties required for the magnetic pole pieces of thin film inductive magnetic heads are high permeability, (See IEEE Transactions on Magnetics MAG-5, 442, E. P. Valstyn and D. W. Kosy, 1969); and high saturation magnetizaton, (See IEEE Transactions on Magnetics, MAG-7, 146, J. P. Lazzari and I. Melnick, 1971). High permeability is required to couple magnetic flux between the coil and magnetic recording medium efficiently, and high saturation magnetization is required to prevent saturation of the pole pieces during the write process. The material compositions used are mostly nickel-iron binary and ternary alloys, where the third constituent, such as chromium, in the ternary alloys increases permeability; or a third constituent, such as rhodium is used to increase corrosion resistance, (See J. C. Suits, "NiFeRh Alloys", U.S. Pat. No. 4,023,965). Silicon-iron alloys are also described in the prior art, as in U.S. Pat. No. 4,049,522.

High permeability is generally achieved using material compositions yielding low magnetostriction. For bulk specimens or thin films with isotropic stress in the plane of the film, permeability is generally maximized at compositions of nickel-iron and silicon-iron alloys which yield small positive magnetostriction. For example, commercial alloys using the trade name, Permalloy, are all iron-rich, thereby yielding positive magnetostriction. Saturation magnetization is also maximized using iron-rich compositions yielding positive magnetostriction. Therefore, the teaching of Permalloy or nickel-iron alloys without specifying composition and the advantages of high permeability and high saturation magnetization implies positive magnetostriction.

Composition ranges have been described which yield positive magnetostriction for part of the range and negative magnetostriction for the other part, as in the aforementioned Suits patent U.S. Pat. No. 4,023,965. However, no preference is taught for the composition range yielding negative magnetostriction. For example, Suits (U.S. Pat. No. 4,023,965) teaches the range 65 to 90 atomic percent nickel, which yields negative magnetostriction. Also, it is known that when rhodium is used in a ternary composition, more than one atomic percent rhodium shifts the magnetostriction toward the positive range.

Valstyn et al, cited supra, have taught the preference for magnetic swithing in the pole tips by the rotation process as preferable to switching by domain wall motion. The advantages of switching by rotation include higher frequency response and higher efficiency, due to higher permeability. Lazzari et al taught the use of multilayered films (alternating magnetic and non-magnetic layers), to promote switching by rotation, and elimination of random pulses in the head output during readback of a recorded pattern. Hempstead et al., U.S. Pat. No. 4,103,315 teaches the use of antiferromagnetic-ferromagnetic exchange bias films to control the magnetic domain structure in thin film magnetic transducers. Nowhere does the prior art teach the use of magnetic pole pieces with negative magnetostriction to promote switching by rotation rather than domain wall motion.

Negative magnetostriction and an anisotropic stress are employed in prior art conventional magnetic recording heads to produce high permeability, for high head efficiency. The magnetic instability that would be found in thin film heads does not occur in conventional heads because the pole pieces in conventional heads are large compared to the size of magnetic domains.

Presently known magnetic head pole pieces used in thin film mangetic heads are made from a nickel-iron alloy. However, such head pole pieces are characterized by positive magnetostriction and are known to suffer from magnetic instabilities which lead to waveform distortion of the readback signal, on-track bit shift, and degraded off-track performance.

In U.S. Pat. No. 3,549,428, issued to J. M. Lommel, a process is described for forming a nickel-iron alloy film having negative magnetostriction on a substrate, and for diffusing copper into the film by annealing in a magnetic field environment to saturate the film, thereby imparting a zero magnetostriction to the alloy film. The objective of Lommel is to arrive at zero magnetostriction in order to realize an increased coercive force in copper-diffused nickel-iron alloy. However, the problem of magnetic instabilities which have been observed in materials having positive magnetostriction were not addressed nor solved.

CROSS-REFERENCE TO RELATED PATENT APPLICATION

In U.S. Pat. No. 4,102,756, filed in behalf of E. Castellani et al, and in copending U.S. patent application Ser. No. 970,709, filed Dec. 8, 1978, in behalf of N. C. Anderson et al, entitled "Electroplating of Nickel-Iron Alloys for Uniformity of Nickel-Iron Ratio Using a Low Density Plating Current" assigned to the same assignee, there are described nickel-iron alloy electroplating methods and apparatus, such as may be used to implement the invention disclosed herein.

BRIEF DESCRIPTION OF THE DRAWINGS

The invention will be described in greater detail with reference to the drawing in which:

FIG. 1 is a sectional view of a thin film head assembly, cut away through the center;

FIG. 2 is a representation of a thin film having the characteristic of positive magnetostriction, as known in the prior art; and FIG. 3 is a representation of a thin film having negative magnetostriction, as employed in the thin film head assembly of FIG. 1, in accordance with this invention.

DISCLOSURE OF THE INVENTION

With reference to FIG. 1, a thin film magnetic head assembly is formed with a nonmagnetic ceramic substrate 10, which has been shaped, polished and cleaned prior to deposition of the thin film structure. After deposition of the thin film structure, the substrate 10 is formed to provide an air bearing surface 11, which may be cylindrical, tapered, taper-flat, or of some other geometry as known in the art. The thin film structure includes a magnetic pole piece layer P1 which is plated onto the substrate 10. A nonmagnetic organic insulator layer 12 electrically isolates the pole piece P1 and a second pole piece P2 which is plated onto the insulator 12. Conductive coils 14 connected to electrical leads are disposed within the body of insulating material 12.

In accordance with this invention, the material of the plated pole piece layers P1 and P2 are formed from a nickel-iron alloy. However, the composition of the Ni-Fe alloy is made to be in the range of 81–84% nickel and 19–16% iron respectively by weight. This preferred composition provides a desirable negative magnetostriction with a saturation magnetostriction coefficient in the range of $-1 \times 10^{-6}$ to $-5 \times 10^{-6}$. By using pole tips of this Ni-Fe composition the problems of instabilities, large on-track bit shift and poor off-track performance are overcome.

In order to achieve a nickel/iron composition having uniformity and homogeneity such that negative magnetorestriction in the prescribed range is realized, a plating bath such as disclosed in the aforementioned U.S. Pat. No. 4,102,756 and (IBM Docket SA978021) is employed. A mixture consisting of the following materials in solution is first prepared:

| | |
|---|---|
| $NiCl_2 \cdot 6H_2O$ | 39 gms per liter |
| $NiSO_4 \cdot 6H_2O$ | 16.3 gms per liter |
| $FeSO_4 \cdot 7H_2O$ | 0.8–1.4 gms per liter |
| $H_3BO_3$ | 25 gms per liter |
| NaCl | 0–50 gms per liter |
| Wetting Agent (e.g. 3M-FC95) | 0.1 gms per liter |
| Sodium Saccharin | 1½ gms per liter |

The various materials are placed in a solution of water and thoroughly mixed. The Ph or alkalinity is adjusted by adding Boric Acid ($H_3BO_3$) to the solution until the Ph is measured at 3.0±0.05. The temperature of the bath is controlled so that a constant temperature of 30° C. is maintained.

In order to apply the proper amount of current to the part to be plated, the surface area of the part, which may be a ceramic used as a substrate for a thin film head assembly, is measured. The computed area is multiplied by a selected current density, in the range of 4–12 milliamperes per square centimeter.

The part which is to be plated, such as the substrate 10 used to support a thin film head assembly, is initially coated with a metallic layer, such as a thin film of nickel/iron of about 800 Angstroms, prior to immersion in the solution bath. Within the bath itself, a nickel electrode serves as the anode. A predetermined current is then applied to the electrode, and the metallized part to be plated serves as the cathode in the solution, and is effectively plated by electrolysis. During plating a magnetic field greater than 5 Oersted is applied parallel to the final air bearing surface, and parallel to the plane of the deposited film. The plating process takes about 30 minutes, in accordance with the thickness desired and the rate of deposition which is realized by the applied current. After the plating process, the composition which has been applied to the part is measured by an electron microprobe.

If adjustment is required so that more iron is to be added to the composition, then an additional amount of $FeSO_4.7H_2O$ is added to the mixture in the solution.

The current density, which can vary within the range of four to twelve milliamperes per square centimeter, and the $FeSO_4.7H_2O$ concentration are adjusted within a specified range of 0.8–1.4 grams per liter to arrive at the nickel/iron composition of the plated film within the range of 81–84% nickel. The first few parts are measured and used to determine the correct proportions of each of the materials that are to be used in solutions for production plating of similar parts. When the correct mixture is obtained, then the composition of the material that is plated onto parts placed into the solution for electroplating will have a nickel content of 81–84%, and the iron content would be accordingly 19–16% by weight. When the desired composition has been attained, negative magnetostriction is displayed.

In accordance with this invention, the plated film is employed for the pole pieces of a thin film magnetic head, which affords stability with minimization of variations of the amplitude and pulse widths of the readout signal. In a specific application, the increased stability ensures that the position error signal, which is derived when reading out prerecorded servo tracks in a servo-system of a disk file, is accurate, thus enabling track seeking and track following to be precise.

FIG. 2 illustrates the condition of positive magnetostriction as found in the prior art, when the nickel/iron composition is rich in iron, i.e., the iron is 20% or more of the composition. The magnetic domain walls are shown in solid lines, and the net tensile stresses are indicated by vertical arrows, whereas the compressive stresses are indicated by the horizontal arrows.

In the case of positive magnetostriction, the easy axis is parallel to the tensile stress direction. The net easy axis is parallel to the applied field from a magnetic medium, such as a disk, which rotates adjacent to the lowermost portion of the representational thin film shown in FIG. 2. The domain walls, when using positive magnetostriction, are displaced in jumps, which tends to enlarge the flux lines.

In contrast, a representational thin film characterized by negative magnetostriction is depicted in FIG. 3, wherein the magnetic switching of main domains is accomplished by rotation in a gradual smooth, not jerky, process. With negative magnetostriction, the easy axis is perpendicular to the direction of tensile stress so that the easy axis induced by the magnetic field during plating is reinforced. As a result, there are less magnetic instabilities so that the signal being processed has higher output and less noise.

It should be understood that the invention may be implemented by alternative processes, other than plating, such as sputter deposition or evaporation.

Also, instead of NiFe, ternary NiFeX alloys having the preferred magnetostriction coefficient in the range of $-1 \times 10^{-6}$ to $-5 \times 10^{-6}$ may be employed. When X is from the group consisting of titanium, vanadium, chromium, cobalt, and copper, the amount of the material X by weight would be less than 8% of the total composition. When X is from the group consisting of zirconium, niobium, molybdenum, ruthenium, rhodium and palladium, the amount of the material X by weight would be less than 16% of the total composition. When X is from the group consisting of hafnium, tantalum, tungsten, rhenium, osmium, iridium, platinum, gold, and mercury, the amount of the material X by weight would be less than 30% of the total composition. When X is from the group boron, carbon, silicon, phosphorus, the amount of the material X by weight would be less than 4% of the total composition. The addition of a third element to NiFe generally requires an increase in the nickel to iron ratio from 81:19 by weight to obtain negative magnetostriction.

It should be understood that the invention disclosed herein is not limited to the specific parameters and materials specified above, which are applicable to the preferred embodiment.

What is claimed is:

1. A thin film magnetic head assembly consisting:

first and second magnetic pole pieces formed as unitary thin film layers said first pole piece being deposited directly on a substrate insulating material disposed between and separating said pole pieces; planar conductive coils in a substantially planar array disposed within said insulating material;

said pole pieces being formed from a magnetic material characterized by negative magnetostriction.

2. A thin film magnetic head assembly as in claim 1, wherein said magnetic material of said pole pieces has a saturation magnetostriction coefficient in the range of $-1 \times 10^{-6}$ to $-5 \times 10^{-6}$.

3. A thin film magnetic head assembly as in claim 1, wherein said magnetic pole pieces are formed from a nickel-iron composition, with a nickel to iron ratio in the range of 81:19 to 84:16 by weight.

4. A thin film magnetic head assembly as in claim 1, wherein said magnetic pole pieces are formed from a ternary nickel-iron-X alloy, having a saturation magnetostriction coefficient in the range of $-1 \times 10^{-6}$ to $-5 \times 10^{-6}$.

5. A thin film magnetic head assembly, as in claim 4, wherein the material X is from the group including boron, carbon, silicon, phosphorous, titanium, vanadium, chromium, cobalt, copper, zirconium, niobium, molybdenum, ruthenium, rhodium, palladium, hafnium, tantalum, tungsten, rhenium, osmium, iridium, platinum, gold, and mercury.

* * * * *